United States Patent

Roberts

[11] Patent Number: 5,963,312
[45] Date of Patent: Oct. 5, 1999

[54] OPTICAL TRANSMISSION SYSTEM FAULT ANALYSIS

[75] Inventor: Kim Byron Roberts, Welwyn Garden, United Kingdom

[73] Assignee: Northern Telecom Limited, Montreal, Canada

[21] Appl. No.: 08/903,220

[22] Filed: Jul. 22, 1997

[30] Foreign Application Priority Data

Aug. 1, 1996 [GB] United Kingdom ............... 9616227.6

[51] Int. Cl.⁶ ................................................. G01N 21/00
[52] U.S. Cl. ............................ 356/73.1; 250/227.17; 250/227.19; 356/73.1
[58] Field of Search .................. 356/73.1; 250/227.17, 250/227.19

[56] References Cited

U.S. PATENT DOCUMENTS

| | | |
|---|---|---|
| 4,300,239 | 11/1981 | Wakabayashi et al. |
| 4,965,856 | 10/1990 | Swanic |
| 5,381,257 | 1/1995 | Ferrar |
| 5,513,029 | 4/1996 | Roberts |

FOREIGN PATENT DOCUMENTS

| | | |
|---|---|---|
| 0 117 868 B1 | 5/1983 | European Pat. Off. |
| 0 123 132 B1 | 2/1988 | European Pat. Off. |
| 0 281 306 A2 | 2/1988 | European Pat. Off. |
| 0 315 331 A2 | 10/1988 | European Pat. Off. |
| 0 449 475 A2 | 3/1991 | European Pat. Off. |
| 0 531 047 A2 | 8/1992 | European Pat. Off. |
| 0 580 316 A1 | 7/1993 | European Pat. Off. |
| WO95/17053 A1 | 6/1995 | WIPO |

*Primary Examiner*—Frank G. Font
*Assistant Examiner*—Reginald A. Ratliff
*Attorney, Agent, or Firm*—John D. Crane

[57] ABSTRACT

A system for locating sources of degradation of an optical path of an optical transmission system comprises means for transmitting (1) along the path a test pattern signal having a frequency spectrum predominately in a band below a data traffic rate means (4) for recovering the test pattern at a plurality of separate points in the path means (4) for determining an amount of pattern degradation from the shape of the recovered pattern, and means (5) for comparing the amounts of pattern degradation at the separate points to locate the source. A broad range of types of degradation can be detected efficiently, and the results used to take corrective action.

21 Claims, 8 Drawing Sheets

OPTICAL TRANSMISSION SYSTEM FAULT ANALYSIS

FIELD OF INVENTION

The invention relates to systems for locating sources of degradation in an optical path of an optical transmission system, monitor receivers for monitoring optical signals, optical transmission systems, and methods of locating sources of degradation of optical signals.

BACKGROUND OF THE INVENTION

In optical transmission systems, it is important for the system to determine when it has failed to transmit error free data, or data with a sufficiently low number of errors to meet the design specification. It is known to count the number of errors in digital data received at the end of an optical path, and thereby calculate the bit error rate (BER).

However, when the bit error rate exceeds the design threshold, it can still be difficult to locate the source of the error whether it be in the receiver, or caused by degradation somewhere in the optical path. It becomes more desirable to be able to locate faults rapidly, when the optical path traverses an optical network containing a combination of optical amplifiers, switches, cross connects, filters, and dispersion compensators. Some types of failure can be detected and located easily. For example, some optical elements in the optical path may generate a loss of signal LOS alarm when the input signal has less power than a given threshold. However, other types of failure will not be detected by such equipment. There is a range of known causes of failure in optical networks, including optical loss, reflections, Fabry-Perot cavities, optical non-linearities, polarisation mode dispersion, optical cross talk, misconnection, and optical noise.

Another fault location method is shown in EP-A-123 132. Here telemetry telegrams are added at each regenerator in an optical transmission system. This enables faults to be located if they cause complete loss of telemetry telegrams from the far side of the location of the fault. This isolates faults to a regenerative span, but not within a single optical path.

It is also known to provide reflections at various distances along the optical path to test attenuation over sections of the optical path. EP-A-0 117 868 shows such a system, which is a form of optical time domain reflectivity (OTDR). Other OTDR systems use wave division multiplexed (WDM) signals. Such reflective systems return only a weak test signal which cannot be used to indicate a wide range of degradations.

Other known techniques are suitable for measuring particular types of degradation, but obviously cannot identify all fault conditions which can affect the optical signal and cause bit errors. For example, U.S. Pat. No. 5,513,029 (Roberts et al) discloses transmitting a low frequency dither and using it to measure the optical signal to noise ratio by detecting the depth of modulation at points in the optical path either side of an optical amplifier, to determine whether that amplifier is adding too much noise. The amplitude but not the shape of the signal is used, and so it does not indicate a wide range of degradations.

As described in EP 0 580 316, numerous analog maintenance signals are modulated onto the primary information bearing signal at different locations along the optical path. Each has a unique frequency or pattern. To determine whether there is a fault, the amplitude of each maintenance signal is monitored at the end of the optical path. There is also disclosure of injecting a maintenance signal at a slightly different wavelength to the primary information signal. Similarly, faults are indicated by an anomaly in the level of the maintenance signal detected downstream.

None of the known systems or methods can assist in locating the source of a broad range of failure mechanisms in an optical path of an optical transmission system. Counting bit errors at intermediate points in the optical path would be a very expensive option, particularly for multi gigabit systems.

SUMMARY OF THE INVENTION

The invention aims to provide improved methods and systems for locating sources of degradation.

According to the invention there is provided a system for locating sources of degradation in a portion of an optical path of an optical transmission system for transmitting data traffic comprising:

means for transmitting along at least the portion of the path a test pattern signal having a frequency spectrum predominately in a band narrower than a band available for data traffic;

means for recovering the test pattern at the end of the portion; and;

means for determining an amount of pattern degradation in the portion from the shape of the recovered pattern.

By transmitting a test pattern, and determining an amount of pattern degradation from the shape of the pattern recovered at the end of a portion of the path, a broad range of types of degradation which would cause bit errors, can be detected. By transmitting a test pattern signal having a frequency spectrum significantly narrower than the data traffic rate, relatively narrow band circuitry can be used for recovering the pattern and determining an amount of pattern degradation from the shape of the pattern. Narrow band transmitting and receiving circuitry is easier to design and cheaper to implement than broadband circuitry. In contrast to conventional loop-back or reflective systems, the measurement of the shape without reflection of loop-backs enables accurate and unambiguous location of degradations. Furthermore, there is less interference with data traffic. Also, the technique can be carried out with data traffic present, which is essential to cover degradations which are dependent on the optical signals present.

Advantageously, the test pattern is recovered for a number of portions and degradations compared so as to enable the location of the source or sources to be identified as being within a given portion of the path.

Advantageously, the test pattern spectrum is predominately low frequency. Low frequency transmitting or receiving circuitry is considerably easier to design and cheaper to implement.

Advantageously, the transmitted test pattern may be digital rather than analogue, for ease of processing and to ensure the pattern is strongly affected by the optical degradations which will affect the data traffic.

Advantageously, the transmitted test pattern is a pseudo random pattern, so that it is likely to suffer degradations in a similar manner to the data traffic.

Preferably the transmitted test pattern is wavelength division multiplexed with the data traffic. This enables the test pattern to be transmitted without interfering with the data traffic. Alternatively, the transmitted test pattern may be time multiplexed or bit interleaved with the data traffic, so that the same optical frequency as the data traffic is used for the test pattern. These two alternative techniques can be combined, to gain the advantages of both. Preferably the transmitted test pattern is at least as susceptible to degradation as the data traffic. This enables the system to respond to degradations which reduce the margin for error, without actually causing bit errors in the data traffic. Preferably the transmitting means and/or the determining means is incorporated into a data traffic handling element of the transmission system.

Preferably, the transmitted test pattern has a modulation depth of 75% or less. This makes the signal more susceptible to various types of interference such as multipath interference, optical cross talk, signal spontaneous beat noise, optical loss, and reflections.

Preferably the test pattern spectrum is predominately in a band less than one octave wide, so as to facilitate implementation.

According to another aspect of the invention there is provided a monitoring receiver for monitoring an optical signal in an optical path of an optical transmission system for use in the abovementioned locating system, the receiver comprising means for recovering a test pattern from the optical signal, means for determining an amount of pattern degradation from the shape of the recovered pattern, and means for transmitting the determined amount to a comparing means for comparison with pattern degradation amounts measured at other points in the optical path. Such a receiver can detect a wide range of types of degradation since it analyses the shape of the recovered pattern. It can use relatively inexpensive components since it is for recovering a test pattern used in the abovementioned locating system, the test pattern having a frequency spectrum predominantly lower than the data traffic rate.

Advantageously the recovering means comprises an adaptive decoder, and the amount of pattern degradation is determined on the basis of eye quality of the shape of the recovered pattern. Analysing eye quality gives an effective way of measuring a wide range of types of degradation which will affect transmission performance.

Preferably, as an alternative, or in combination with the abovementioned technique, the amount of pattern degradation is determined by deriving a digital bit stream from the shape of the recovered pattern, and comparing it with a predetermined bit stream, to detect bit errors. This provides a way of accurately determining degradation which will affect the data traffic, with a minimum amount of hardware. Furthermore, detecting bit errors, which can be easily converted into a bit error rate, can give an accurate indication of the degree of degradation present.

Preferably the locating system is incorporated in a transmission system and means for reducing degradation are provided, controllable on the basis of an output of the locating system. Preferably the monitoring receiver is incorporated in an optical transmission system and means for reducing degradation are provided, controllable on the basis of an output of the monitoring receiver.

According to another aspect of the invention, there is provided a method of locating sources of degradation in at least a portion of the optical path of an optical transmission system, comprising the steps of:

transmitting a test pattern signal having a frequency spectrum predominately in a band narrower than a band available for data traffic, recovering the test pattern at a plurality of portions in the path;

determining an amount of pattern degradation from the shape of the recovered pattern; and comparing the amounts of pattern degradation of the portions to locate the source.

Preferred features for the method are set out in dependent claims. Preferred features can be combined as appropriate.

BRIEF DESCRIPTION OF THE DRAWINGS

For a better understanding of the invention and how the same may be carried into effect, it will now be described in greater detail, by way of example, with reference to the attached drawings, in which.

DETAILED DESCRIPTION

Figure 1:
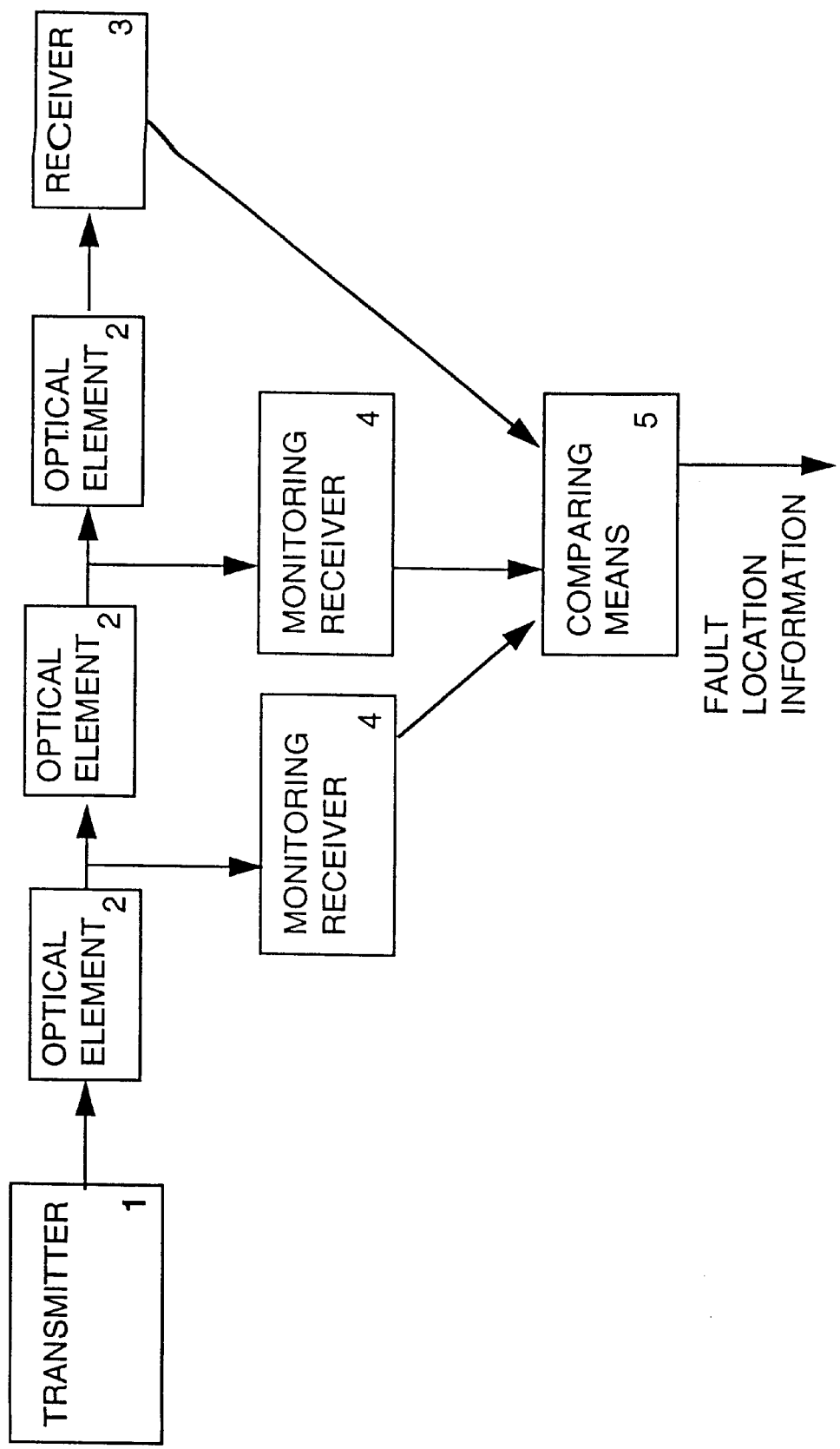
FIG. 1 shows an optical transmission system incorporating features of the invention.

FIG. 1 shows an optical transmission system including a transmitter 1, a series of optical elements 2, and a receiver 3. An optical path extends between the transmitter 1 and the receiver 3. Optical elements 2 may be optical amplifiers, switches, cross connects, filters, dispersion compensators, or other elements which process the optical signal in the optical path.

There may be any number of optical elements in the optical path, and obviously there may be branches and alternative routes if the optical path is part of an optical network.

The transmitter 1 is for transmitting data traffic along the optical path, and for transmitting a test pattern signal. Monitoring receivers 4 are shown for picking up and monitoring the test pattern from various points in the optical path. There may be any number of these, located according to the required level of resolution of location of the source of any degradation in the optical path. An alternative embodiment in which separate test pattern signals are inserted for different portions of the optical path, will be described later with respect to FIG. 8.

A comparing means 5 is shown for receiving the outputs of the monitoring receivers and, optionally the output of the end receiver 3. The comparing means can thus determine the location of the source of any degradation by examining the differences between the levels of degradation detected by receivers at neighboring or successive locations along the optical path.

The parts of the optical transmission system shown in FIG. 1 which can be regarded as belonging to the locating system include part of the transmitter 1, for transmitting a test pattern signal, the monitoring receiver 4 for recovering the test pattern and determining an amount of pattern degradation from the shape of the recovered pattern, and the comparing means 5 for comparing the amounts of pattern degradation at the separate points to locate the source.

Figure 2:
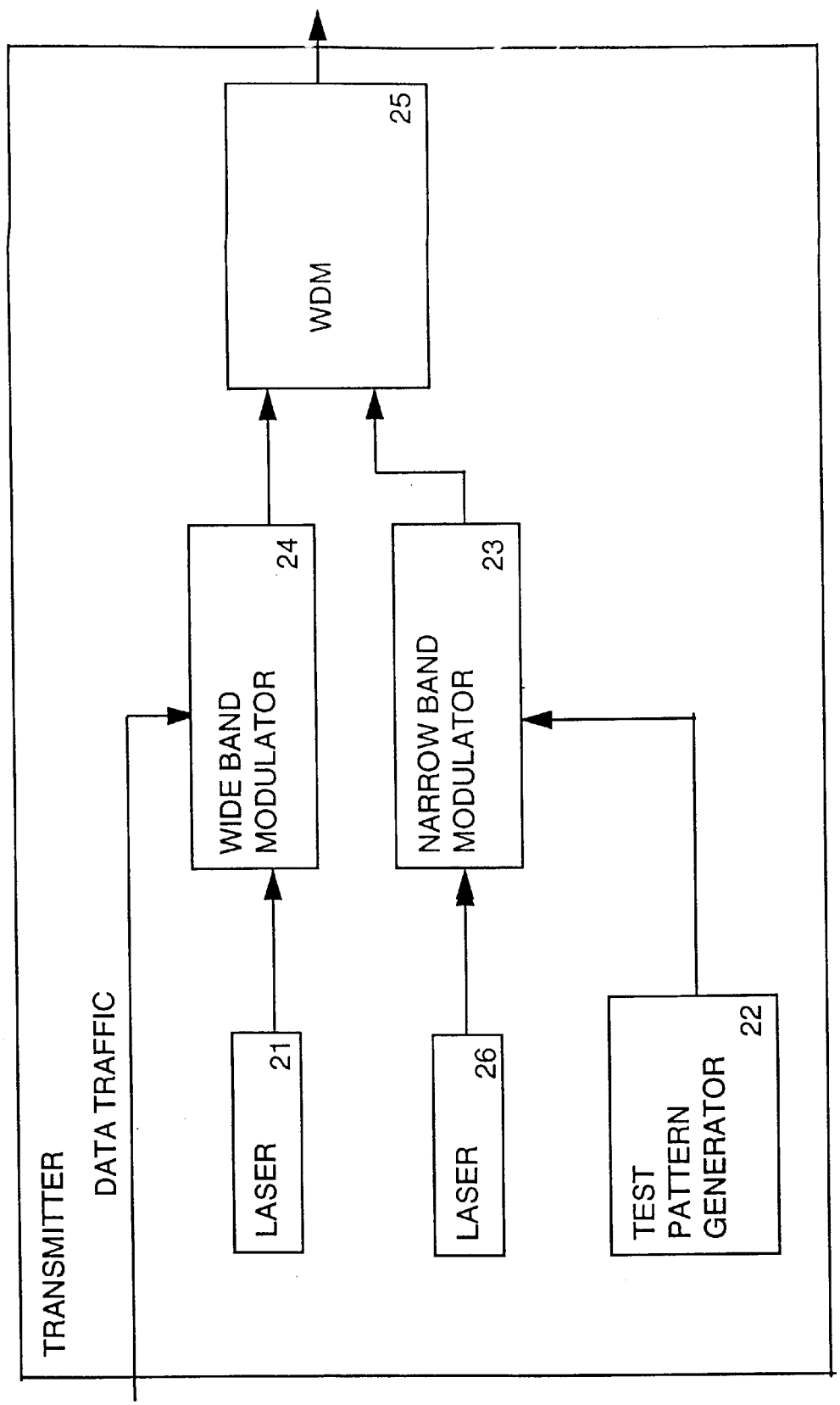
FIG. 2 shows a transmitter of the embodiment of FIG. 1.

FIG. 2 shows a more detailed schematic diagram of a transmitter for use in the transmission system of FIG. 1. A laser 21 forms the optical source, which feeds a wideband modulator 24. Digital data traffic which may be at a rate of multiple gigabits per second is modulated onto the optical signal from the laser. The output of the modulator 24 is fed to a wavelength division multiplexing device 25 which may multiplex a number of traffic carrying signals at different optical wavelengths (though only one is shown). In addition, the wavelength division multiplexing device 25 multiplexes a test pattern signal. A test pattern generator 22 is provided. This can take the form of a shift register producing a predetermined pseudo random digital pattern. This is modulated onto an optical signal by a narrowband modulator 23 before being wavelength division multiplexed with the data traffic. Two alternative classes of test pattern will be described. Firstly, the pattern can be high frequency narrowband, eg 10 GHz±10 MHz. Alternatively, or in combination, the pattern can be low frequency, eg 0 to 150 MHz. The high frequency narrowband pattern can provide improved coverage for degradations owing to non linearities which affect fast signal transitions, such as self-phase modulation. It can be implemented more easily and cheaply than a wideband pattern because resonant microwave techniques can be used. A wideband system generally needs flat gain across eg five decades of bandwidth. Where the bandwidth is an octave or less, local peaking and local matching techniques can be used. Eg a 10 MHz signal can be modulated onto a 10 GHz carrier and demodulated at the receiver by beating down with a local oscillator. This can be implemented using well known techniques and will not be described further.

If the test pattern has a frequency spectrum predominantly in a band lower than the data traffic rate, then the test pattern generator 22 and the narrowband modulator 23 can be constituted by hardware which is lower speed, and thus less expensive, and easier to design, than higher speed circuitry as will be provided for the data traffic. Also, the circuitry in the monitoring receivers can be provided cheaply and efficiently. With current technologies there is a significant cost increase when the data frequency being handled is greater than 100 to 200 MHz. Obviously this threshold will vary with further development of hardware in the future.

Figure 3:
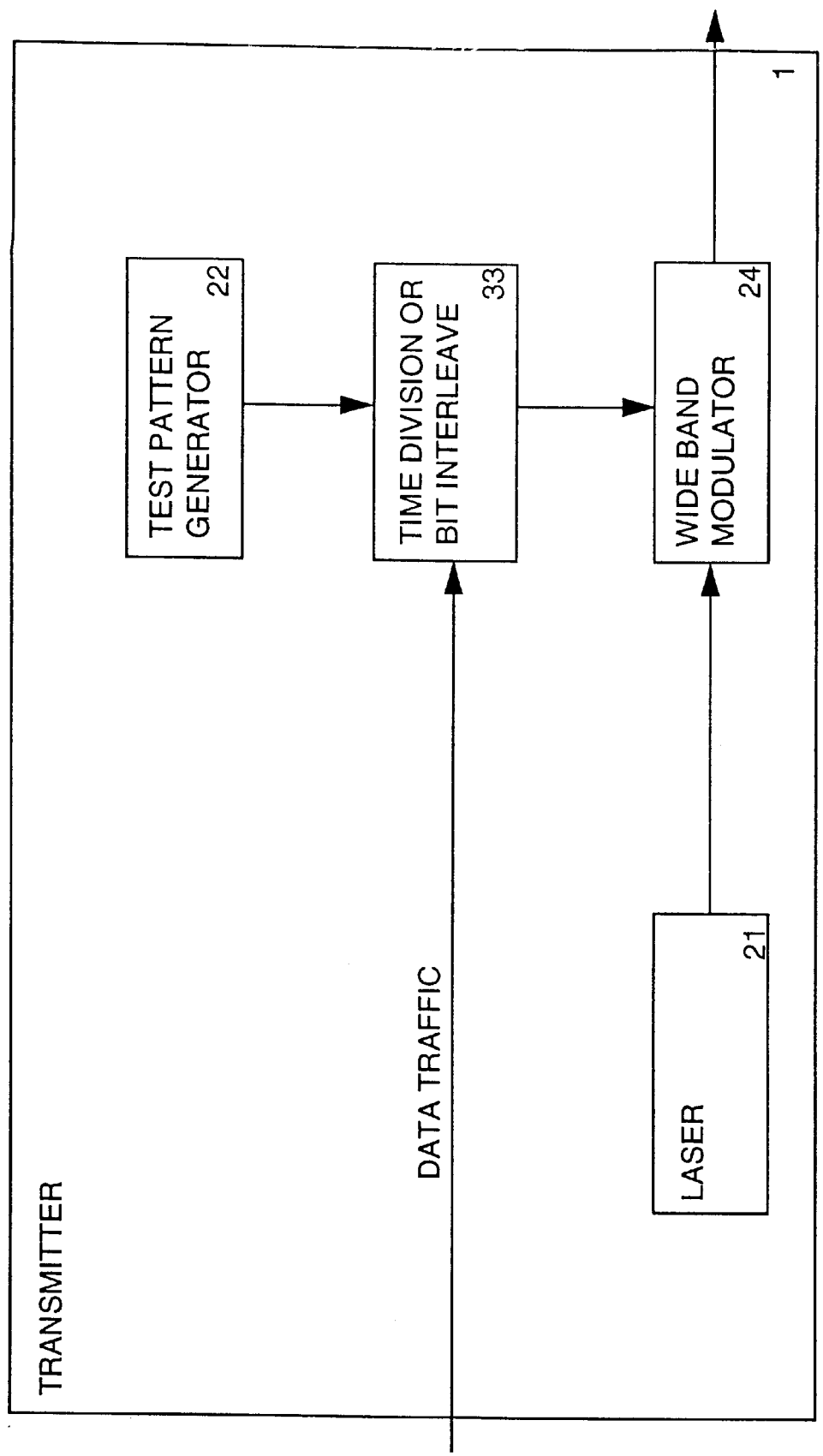
FIG. 3 shows another alternative transmitter of the embodiment of FIG. 1.

FIG. 3 shows an example in which the same optical frequency is used for the test pattern and for the data traffic. As shown in FIG. 3, the transmitter includes a test pattern generator 22, and a time division or bit interleave element 33. A pattern with say 64 bits in a row of a 10 Gb/s bitstream would be possible, but might affect the clock recover circuit in the receiver. Furthermore, Sonet and SDH standards for optical signals fix the data rate and scramble the full frame, making introduction of such bits difficult. However, an advantage which this method achieves arises from the optical wavelength of the test pattern signal being the same as the optical wavelength of the data traffic. This will provide improved coverage of wavelength specific degradations, such as Brillouin scattering, or four-wave mixing.

In either of the case shown in FIGS. 2 and 3, the test pattern generator can be implemented in the form of a shift register pseudo random based pattern generator. Pseudo random pattern generation eg by shift register based circuits is a well known art. One reference work on the subject is "shift register sequences" by Solomon W Golomb, Aegean Park Press 1982. In the case shown in FIG. 2, the resulting pattern could be a NRZ modulated 155 Mb/s signal.

Figure 4:
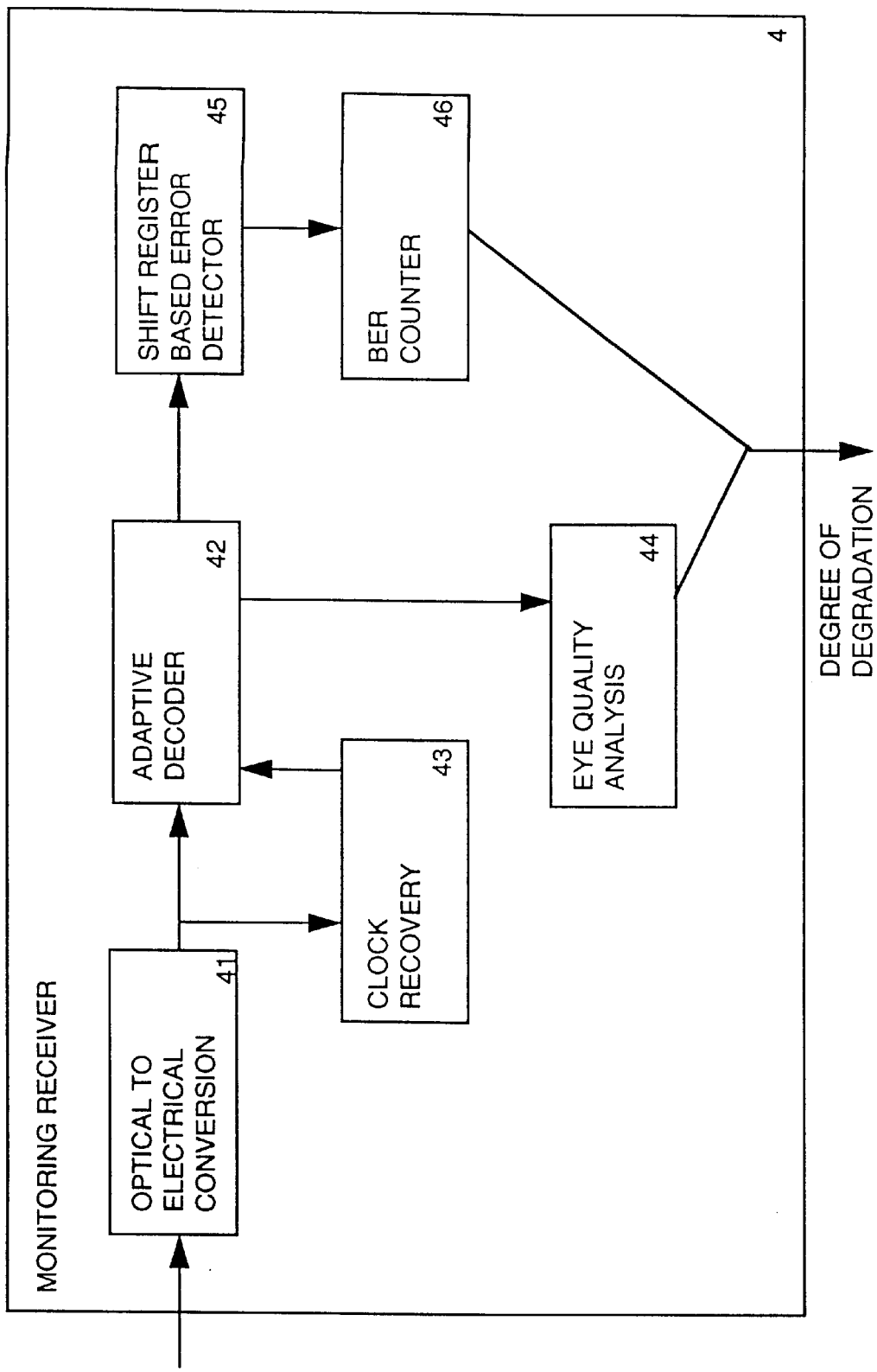
FIG. 4 shows in more detail an example of the monitoring receiver of the embodiment of FIG. 1.

FIG. 4 shows an example of a monitoring receiver of the embodiment of FIG. 1, suitable for low frequency digital test patterns. A small percentage of the optical signal is tapped off the main optical path and fed to an optical to electrical converter 41. This can be implemented in the form of a photo detector with a limited bandwidth so as to pick up only the lower speed digital test pattern, and not the high speed data traffic or in filtering, eg at the tap or before the photo detector.

The electrical output is fed to an adaptive decoder for recovering the digital bitstream. A clock recovery circuit 43 is provided in association with the decoder. An example of a suitable decoder is the super-decoder disclosed in a patent by Tremblay and Nicholson (U.S. Pat. No. 4,823,360) incorporated herein by reference. This super-decoder is an example of an adaptive decoder which alters the switching thresholds according to the shape of the eye formed by the positive and negative levels of the bitstream. This concept of an eye shape formed by the two levels is well known and discussed in many text books. Briefly, the eye is the area between the lowest points of a high level logic signal, and the highest points of a low level logic signal. Owing to bandwidth limitations and noise degradation, the area usually has the shape of an eye. By looking at the eye quality, in other words the size and shape of the eye, an assessment of the degree of degradation can be made.

Such analysis can take the form of straightforward thresholding, or a more complex statistical analysis. For example, the amount of vertical opening of the eye between the $10^{-5}$ BER contours, as measured by the super-decoder, and can be used as an indication of the quality of the eye.

Alternatively, or as shown in FIG. 4, in combination with the eye quality analysis, a shift register 45 and BER counter 46 are shown. The adaptive decoder 42 feeds a shift register-based error detector 45 with a recovered digital bitstream. The error detector outputs pulses for each single bit error. The shift register based circuit is an example of a self synchronising descrambler that reverses the operation of the pseudo random pattern generator. It operates by multiplying the bitstream by the same polynomial that the pattern generator had used to divide by.

In these kinds of error detectors, the shift register may output two non zero pulses for each single bit error. The counter will be incremented twice for each bit error, and therefore the counter output should be divided by two, by dropping the least significant bit of the counter output.

This gives a relatively cheap and efficient hardware implementation for determining a bit error rate which will be a measure of the degree of degradation in the optical path.

Figure 5:
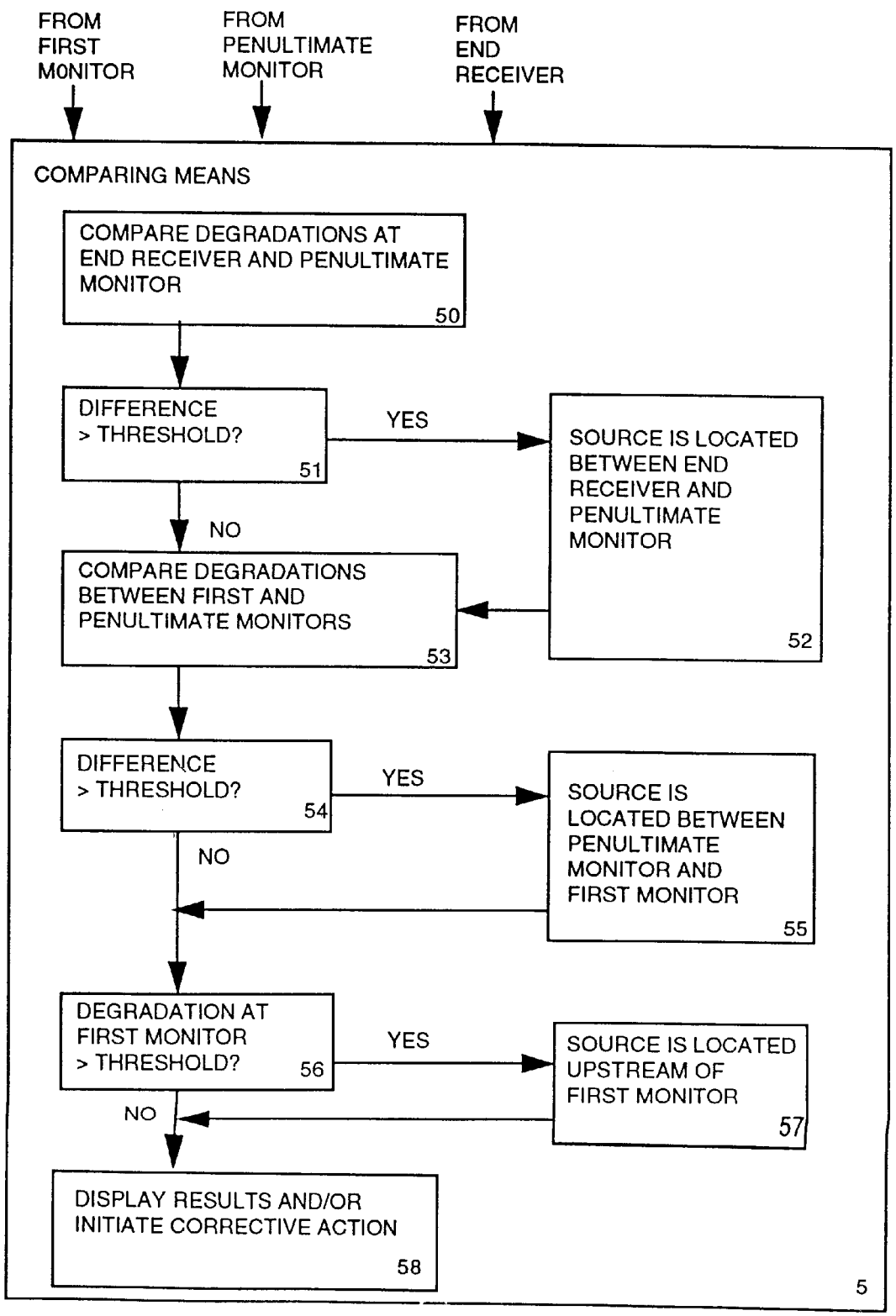
FIG. 5 shows in schematic form the functions of the comparing means of the embodiment of FIG. 1.

FIG. 5 shows in schematic form the functions of the comparing means 5 shown in FIG. 1. It is fed by three inputs, representing degrees of degradation measured by the first monitoring receiver, by a second or a penultimate monitoring receiver, and by the end receiver. The end receiver can either be constituted by the same circuitry used for the monitoring receiver, or it could derive a bit error rate from the actual data traffic.

In a first step 50, degradations at the end receiver and penultimate monitoring receiver are compared. At step 51 the difference is compared to a threshold. If the difference is greater than the predetermined threshold, this indicates that there is a source of degradation between the end receiver and the penultimate monitoring receiver. The same operation is carried out at steps 53 and 54 for the degradations measured at the first monitoring receiver and the penultimate monitoring receiver. As shown in box 55, if the difference is greater then the threshold then there is a source of degradation located between the penultimate monitoring receiver and the first monitoring receiver. To identify whether there is alternatively or additionally a source of degradation upstream of the first monitoring receiver, box 56 shows comparing the degradation at the first monitoring receiver to a threshold. If it is greater than the threshold then there is a source of degradation located upstream of the first monitoring receiver.

The results can either be displayed and/or used to initiate corrective action, in step 58. The threshold used at the various comparison steps in the comparing means can be set according to the degree of sensitivity required. The comparing means could be implemented with hardware comparators but is more conveniently implemented using a micro processor. It is desirable that results be produced rapidly to enable immediate corrective action if appropriate.

The comparing means may well be located at a central remote location, in which case some form of data transmission will be required between monitoring receivers and the comparing means. If the distances and data rates for such transmissions are relatively low, then a local area network may be appropriate. In some cases, there will be numerous optical elements and monitoring receivers corresponding to the optical elements within the same cabinet or equipment rack. In this case, communication can be provided through back planes. Degradation source location information could be displayed by LEDs at the front of each field replaceable unit, to indicate the location of faults.

The steps carried out by the comparing means 5 could be carried out manually if the degrees of degradation from each of the monitoring receivers is displayed to an operator. Remedial action can be carried out manually, or automated.

Figure 6:
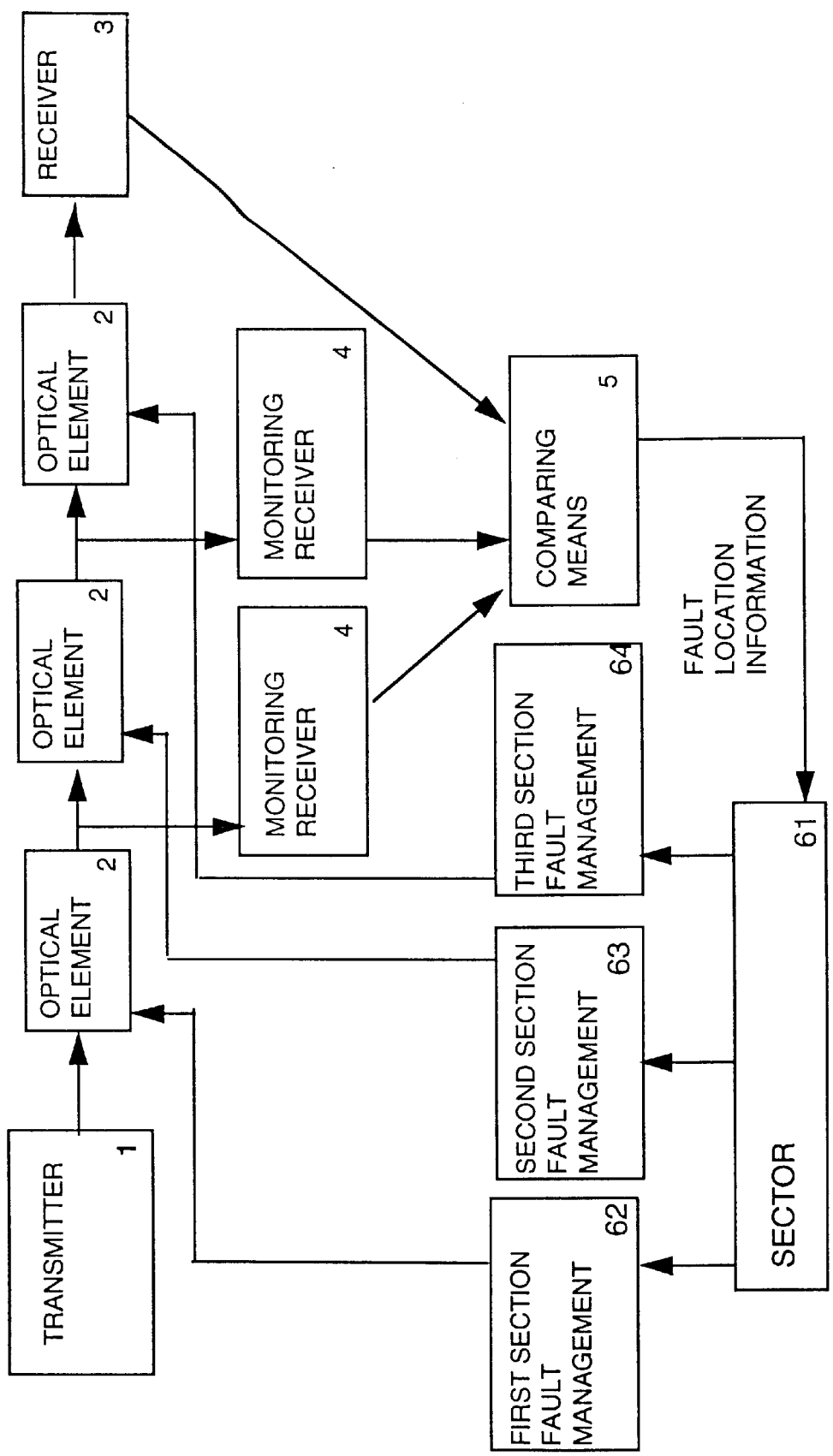
FIG. 6 shows the system of FIG. 1 with additional features.

FIG. 6 shows how remedial action may be automated. Based on location information output by the comparing means 5, localised. fault management equipment 62, 63, 64 is alerted optically via a selector 61. One or more of the local section fault management equipments, 62, 63 or 64 can then take appropriate action. This may involve adjusting the gain of optical amplifiers, altering dispersion compensation devices, or switching in redundant replacement units. If protection switching is to be carried out locally in the optical path, triggered by this method, speed and reliability are especially important. In some cases it may be possible to set the sensitivity of the monitoring receiver and the comparing means at such a level that problems caused by gradually worsening degradations can be dealt with before they have an impact on the bit error rate of the data traffic.

Figure 7:
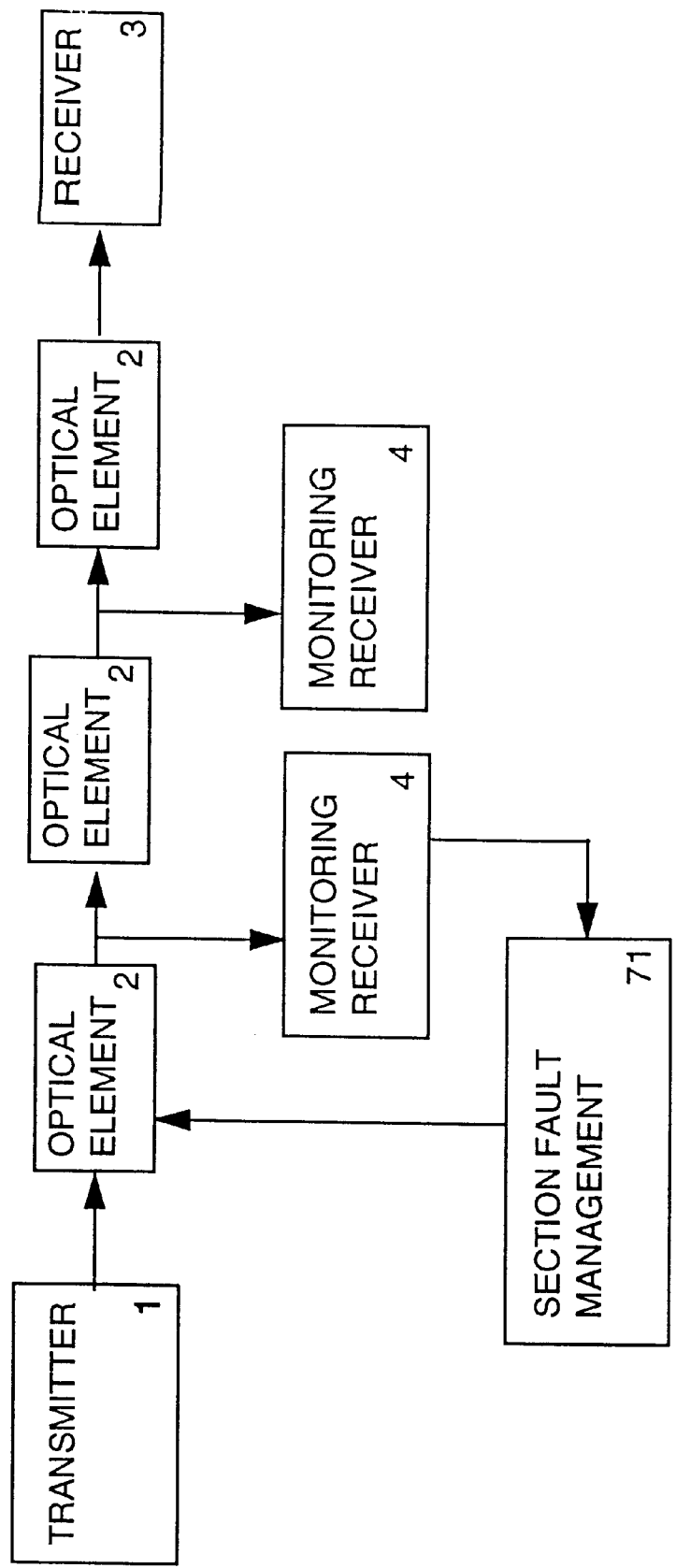
FIG. 7 shows another optical transmission system with features of the invention.

FIG. 7 shows an optical transmission system in which means for reducing degradation in the optical path are shown in the form of a local fault management unit 71 controllable on the basis of an output of the monitoring receiver 4. Here, as in FIG. 6, the remedial action to reduce degradation can take the form of switching in redundant hardware, or adjusting controllable elements such as optical amplifiers or dispersion compensation units.

Figure 8:
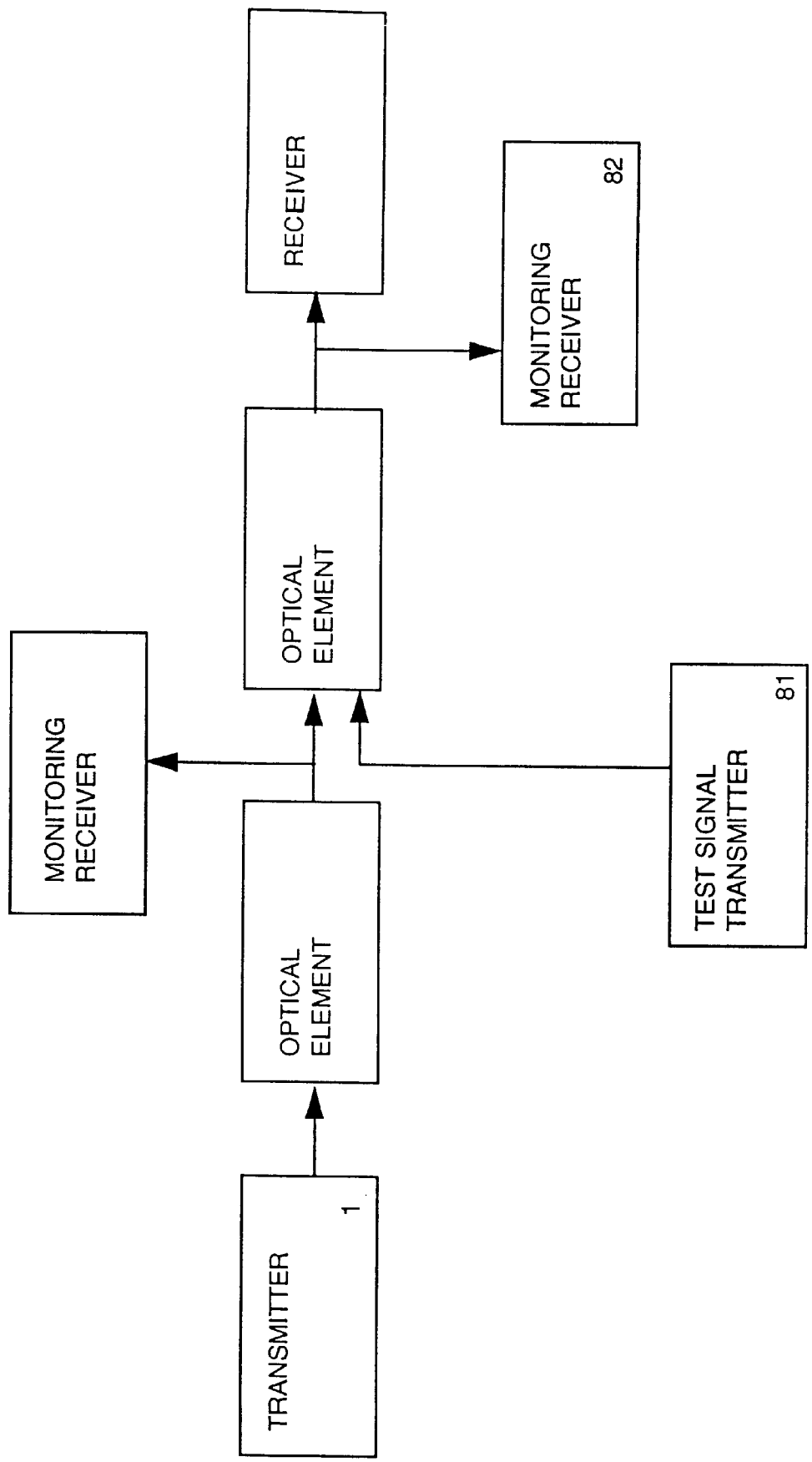
FIG. 8 shows another optical transmission system with features of the invention.

FIG. 8 shows an embodiment where a test signal is inserted into a portion of the optical path by a test signal transmitter 81. At the end of the portion, a monitoring receiver 82 recovers the test pattern in the manner described previously. An advantage of this configuration is that the monitoring is independent of the data traffic transmitter. Hence retrofitting into an existing transmission system is facilitated.

Multiple portions can be tested by separate pairs of transmitters and monitoring receivers. Interference between pairs can be reduced by filtering out the test signals between portions. The portions may overlap if the test signals are independent. Otherwise, the features of the other embodiments can be applied to this embodiment. Conceivably there could be a single monitoring receiver arranged to receive a number of independent test patters inserted at different points upstream, and a comparison of degradations would enable the location to be determined as being between two test pattern signal insertion points.

The system and methods disclosed can achieve detection and location of a broad coverage of failure mechanisms, and can react rapidly, without requiring a disproportionate amount of hardware. Although a digital type of test pattern signal has been described, analogue signals such as a sinusoidally modulated signal could be used. The modulation depth may be reduced, for example to less than 75%, to increase the sensitivity to degradations. If the source optical linewidth for the test pattern is substantially narrower than the pattern bandwidth, sensitivity to multipath interference is enhanced. The remedial action taken by section fault management units can depend both on the degree of degradation, output by the monitoring receiver 4, and the fault location information output as a result of comparison operations carried out by the comparing means 5. Other variations will be apparent to those skilled in the art, within the scope of the claims.

I claim:

1. A system for locating sources of degradation in a portion of an optical path of an optical transmission system for transmitting data traffic comprising:

means for transmitting along at least the portion of the path a test pattern signal having a frequency spectrum predominately in a band narrower than a band available for data traffic;

means for recovering the test pattern at the end of the portion; and;

means for determining an amount of pattern degradation in the portion from the shape of the recovered pattern.

2. The system of claim 1 wherein the means for recovering the test pattern is arranged to recover the test pattern portions of the optical path; and the system comprises means for comparing the amounts of pattern degradation for the separate portions to locate the source.

3. The system of claim 1 wherein the frequency band of the test pattern is at a low frequency end of the data traffic band.

4. The system of claim 1 wherein the transmitted test pattern is a digital pattern.

5. The system of claim 4 wherein the transmitted test pattern is a pseudo random pattern.

6. The system of claim 1 wherein the transmitted test pattern is wavelength division multiplexed with the data traffic.

7. The system of claim 1 wherein the transmitted test pattern is time multiplexed or bit interleaved with the data traffic.

8. The system of claim 1 wherein the test pattern spectrum is predominately in a band less than one octave wide.

9. The system of claim 2 wherein the transmitted test pattern has a bit rate of not more than 155 Mb/s, and the data traffic rate is at least 1 Gb/s.

10. The system of claim 1 wherein the transmitted test pattern is at least as susceptible to degradation as the data traffic.

11. The system of claim 1 wherein the means for transmitting is incorporated into a data traffic handling element of the transmission system.

12. The system of claim 1 wherein the determining means is incorporated into a data traffic handling element of the transmission system.

13. The system of claim 1 wherein the transmitted test pattern has a modulation depth of 75% or less.

14. A monitoring receiver for monitoring an optical signal in an optical path of an optical transmission system, for use in the locating system of claim 1, the receiver comprising means for recovering a test pattern from the optical signal;

means for determining an amount of pattern degradation from the shape of the recovered pattern; and means for transmitting the determined amount to a comparing means.

15. The receiver of claim 14 wherein the means for recovering the test pattern comprises an adaptive decoder, and the means for determining an amount of pattern degradation is operable on the basis of eye quality of the shape of the recovered pattern.

16. The receiver of claim 14 wherein the means for determining an amount of pattern degradation comprises means for deriving a digital bitstream from the shape of the recovered pattern, and comparing it with a predetermined bitstream to detect bit errors.

17. An optical transmission system comprising the locating system of claim 1 and comprising means for reducing degradation in the optical path, controllable on the basis of an output of the locating system.

18. An optical transmission system comprising the monitoring receiver of claim 14, and comprising means for reducing degradation in the optical path, controllable on the basis of an output of the monitoring receiver.

19. A method of locating sources of degradation in at least a portion of an optical path of an optical transmission system, comprising the steps of:

transmitting a test pattern signal having a frequency spectrum predominately in a band narrower than a band available for data traffic;

recovering the test pattern for a plurality of portions of the path;

determining an amount of pattern degradation from the shape of the recovered pattern; and comparing the amounts of pattern degradation of the portions to locate the source.

20. The method of claim 19 wherein the comparison step is carried out automatically by a comparison means.

21. Apparatus for locating sources of degradation in a portion of an optical path of an optical transmission system, the system being suitable for transmitting data traffic, and for transmitting along at least the portion of the path a test pattern signal having a frequency spectrum predominately in a band narrower than a band available for data traffic, the apparatus comprising:

circuitry for recovering the test pattern at the end of the portion; and;

circuitry for determining an amount of pattern degradation in the portion from the shape of the recovered pattern.

* * * * *